United States Patent Office.

THERON C. CRAWFORD, OF NEW BRIGHTON, AND LUDWIG K. BÖHM, OF NEW YORK, N. Y., ASSIGNORS TO THE STERLING LIGHT COMPANY, OF TRENTON, NEW JERSEY, AND NEW YORK, N. Y.

PROCESS OF MAKING INCANDESCENT ELEMENTS.

SPECIFICATION forming part of Letters Patent No. 516,079, dated March 6, 1894.

Application filed March 30, 1893. Serial No. 468,379. (No specimens.)

*To all whom it may concern:*

Be it known that we, THERON C. CRAWFORD, a citizen of the United States, residing at New Brighton, in the county of Richmond, and LUDWIG K. BÖHM, a subject of the Emperor of Germany, residing in New York, in the county of New York, State of New York, have invented a certain new and useful Process of Making Incandescent Elements or Mantles for Incandescent Burners, of which the following is a specification.

Our present invention relates to the production of burners which are designed for use with gas, and are intended to be rendered incandescent by the combustion of the latter and thus produce an illuminating effect.

The invention refers to the manufacture of burners, such as described in our prior application, Serial No. 459,426, filed January 23, 1893, and is an improvement upon the method of making said burners, set forth in the said application; and consists in the mode of preparing the plastic mass from which the burners or mantles, are to be made. In the composition described in our said application, the incandescent material is magnesium oxide and this is mixed with silicic acid and alkali. In this composition the pure silicic acid is used as the mineral binder for forming the supporting skeleton, and is a very important element; but as there set forth it is employed in the condition of a dry dust-like powder. This powder is obtained by precipitating silicate of sodium or potassium, or as it is called "water glass," by hydrochloric acid in the usual way, and then carefully washing out and drying the precipitate. This precipitate is the anhydrous silicic acid ($SiO_2$) dried at 120° centigrade, is no longer soluble in water or diluted acids, and if heated more highly is even no longer soluble in aqueous alkali. It therefore differs from the gelatinous silicic acid ($SiO_3H_2$) not only in composition but also in quality and effect as herein further explained. The precipitated mass is at first in a gelatinous condition and it requires several days to dry this mass so that it will form a dry dust-like powder suitable for use, as described in our said prior application.

From experiment and test, we have discovered that the silicic acid may be used in the gelatinous condition in which it is found when precipitated, and that when so used it presents a great practical advantage over the employment of silicic acid as a dry dust-like powder.

In carrying out our improvement, we prepare a sugar solution, and to about one part, by weight, of said solution, add about one quarter part gelatinous silicic acid, as it is obtained by precipitation described above, and without any drying; these ingredients are rubbed together until a uniform product is obtained. And there is then added in small quantities successively about one part of magnesium oxide. The mass is rubbed together after the addition of each quantity of magnesium oxide. The result is a plastic mass which gives about ninety per cent. of magnesium oxide and ten per cent. of silicic acid in the finished article, when the moisture and organic substances are burned out in baking ovens. This mixture forms a plastic composition in which the silicic acid is evenly distributed forming a continuous frame or skeleton and which is ready to be made up into burners, or mantles, without further manipulation, and the burners, or mantles, are prepared therefrom either by spinning threads, which form the burner, or molded into the required shape, and are then baked in suitable ovens. The sugar solution is highly saturated and prepared in a pure condition, so as to avoid discoloration of the light by salts, which are found in commercial molasses.

Organic substances used as binders, as described in our prior application referred to, are used in the plastic mass, formed as described above, where sugar solution forms the organic binder, but other organic glutinous substances may be used in the place of sugar. There is an important practical advantage in this use of the silicic acid in a gelatinous condition instead of a dry pulverized state. A plastic substance is formed at once by the mixture of the original elements, and this plastic mass will remain in a uniform plastic condition for a considerable time. As already stated, it requires several days to dry the precipitated silicic acid; if employed in the gelatinous condition, as described, it requires a correspondingly long time to dry, and consequently the mass retains its plastic character longer than is necessary to work up any convenient quantities in practice. In the use of the dry silicic acid, only a small quantity of the plastic material can be made and utilized at once, for the mass hardens quickly so that it will soon become difficult to shape the burners, and after some time, entirely impossible to do this. The hardened mass then has to be reduced to fine powder, and as such mixed with fresh powders, to form a new mass. This difficulty is completely overcome by the use of the silicic acid in gelatinous condition, because it remains in a plastic state a much longer time; this permits a large quantity of the material to be made up at once and then entirely worked up into burners before hardening prevents. Furthermore, it obviates the necessity of using any additional glutinous substances for the purpose of producing a plastic material. The use of the acid in this gelatinous condition therefore effects some saving in expense, and also greatly facilitates the manipulation of the compound in making burners, and renders their production simpler and more practical in a commercial way.

Modifications in composition, such as those suggested in our prior application aforesaid, may be made with the use of silicic acid in gelatinous condition the same as with the said acid in a dry powder state.

Having thus described our invention, what we believe to be new, and desire to secure by Letters Patent, is—

1. The herein described process of making a composition for incandescent burners, the same consisting in first mixing gelatinous silicic acid as it is formed by precipitation, with a sugar solution and rubbing well together; and then adding successive quantities of magnesium oxide and rubbing together until the mass is uniform, the ingredients being in proportion, substantially as described.

2. In a process of forming a composition for incandescent burners composed of magnesium oxide, silicic acid and an organic binder, the use of silicic acid in a gelatinous condition as formed by precipitation, substantially as described.

THERON C. CRAWFORD.
LUDWIG K. BÖHM.

Witnesses:
JAS. H. PATTERSON,
C. J. CORNELL.